United States Patent [19]

Coquelet

[11] Patent Number: 4,634,073
[45] Date of Patent: Jan. 6, 1987

[54] BRAKE FOR FISH CASTING REEL
[75] Inventor: André Coquelet, Cluses, France
[73] Assignee: Mitchell Sports, France
[21] Appl. No.: 715,636
[22] Filed: Mar. 22, 1985
[30] Foreign Application Priority Data
Mar. 26, 1984 [FR] France ................. 84 05419
[51] Int. Cl.⁴ .................. A01K 89/01; A01K 89/02
[52] U.S. Cl. ............................................. 242/84.5 A
[58] Field of Search ............... 242/84.5 A, 84.5 P, 242/84.51 P, 84.53, 84.2 A, 84.21 A, 84.21 R, 242/99

[56] References Cited
U.S. PATENT DOCUMENTS

| 2,624,523 | 1/1953 | Sawitzke | 242/84.2 |
| 2,918,227 | 12/1959 | Mauborgne | 242/84.21 R |
| 2,932,464 | 4/1960 | Mauborgne | 242/84.2 R |
| 2,988,298 | 6/1961 | Purnell | 242/84.2 A |
| 3,223,346 | 12/1965 | Fowler | 242/84.2 A |
| 4,391,419 | 7/1983 | Iwama et al. | 242/84.5 P |
| 4,470,554 | 9/1984 | Kobayashi et al. | 242/84.5 P |
| 4,529,142 | 7/1985 | Yoshikawa | 242/84.5 A |

FOREIGN PATENT DOCUMENTS

| 1657104 | 1/1971 | Fed. Rep. of Germany . |
| 2630144 | 1/1977 | Fed. Rep. of Germany . |
| 970757 | 6/1950 | France . |
| 1130332 | 9/1956 | France . |
| Ad.77644 | 2/1962 | France . |
| 1462765 | 11/1966 | France . |
| 386765 | 4/1964 | Switzerland . |
| 470695 | 8/1937 | United Kingdom . |

Primary Examiner—Billy S. Taylor
Attorney, Agent, or Firm—Ratner & Prestia

[57] ABSTRACT

The reel is of the fixed spool type with rear brake, and comprises a drive shaft a first end of which supports the spool, a main spool brake with an operating member actuatable from the rear of the reel by the user, an auxiliary braking lever comprising a grippable part forming a control member for pushing a braking member against a braking surface of the shaft, wherein a resilient transmission means is inserted directly between the grippable part of the auxiliary braking lever and the braking member for transmitting the auxiliary braking force, and the auxiliary braking lever is urged by resilient return means bringing it back to the rest position.

8 Claims, 3 Drawing Figures

BRAKE FOR FISH CASTING REEL

BACKGROUND OF THE INVENTION

1. Field of the Invention

The present invention relates to casting reels for fishing and in particular to those having a fixed spool and a rear brake controlled from the reel.

2. Description of the Prior Art

FIG. 1 shows a sectional view of a reel of this type widely known and used. In this reel, the line reserve called spool or drum 1 is a part substantially of revolution formed from two radially extending side-plates joined together by a cylindrical hub extending axially from one side-plate to the other. The axis of the reel is approximately parallel to the spooling off direction of the line. The line spool is secured against rotation both for casting and for winding in. A crank handle causes a line recovery winder to rotation which rotates about the spool and winds in the line.

In most of the reels of this type known in the prior art, the spool is no longer fixed if the tension in the line exceeds a limit value chosen by the angler. For this, spool 1 is connected to the reel housing 13 through a kinematic chain which comprises at least one strain limiting device, also called brake. Spool 1 is fixed on shaft 2 by a clip 3 and a groove 4 engaging respectively with groove 5 and the pin 6 of the shaft. The shaft reciprocates axially with a translational movement under the action of a line winding system not shown in the Figure. The shaft thus slides to its other end in a sleeve 8 with which it is interlocked for rotation by two flats 7 on the shaft in engagement with corresponding internal flats in the sleeve 8. The outer surface of sleeve 8 comprises two flats 9 and receives washers 10 whose central hole has a section corresponding to the external section of the sleeve for sliding axially thereon without possibility of rotating. The sleeve comprises a flange 11 bearing against a stop forming part 18 of the housing 13 and on a cylindrical bearing surface 12 engaged in a bore of this same part 18 of the housing for centering the sleeve. Washers 14, fitted loosely on the sleeve and inserted between washers 10 have a radial extension which engages in a groove 15 in the housing for preventing rotation thereof. Washers 10 and 14 have appropriate friction properties. The sleeve 8, washer 10 and washer 14 assembly is axially compressed between the stop forming part 18 of the housing and a first spring 17 tensioned by a nut 16 for adjusting the braking torque.

Nut 16 is accessible from the rear of the reel so that there is no risk of mistaking it for the reel changing means, generally disposed at the front; it can be readily gripped because of its suitable size, and it is not disturbed by the presence of the line.

Limiting the tension of the line by means of the brake meets first of all the requirement of not breaking the line if the fish is too active to be brought in by force and must be played before being put into the landing net. Secondly, anglers have discovered that it is possible to catch some kinds of fish which take the bait very rapidly but release it if they feel the slightest resistance, by choosing a very low value for the maximum tension of the line. However, this method leads to many operations which may give rise to mistakes, for then this maximum tension must be increased for striking, playing, winding in the fish and putting it in the landing net. Furthermore, in some cases this value must be increased, for example so as to free the bait from an obstacle on which it is caught.

Patent No. FR-E-77644 to Rouanet divulged a reel with main brake controlled from the side by means of a screw urging, through a spring, a brake shoe against the outer surface of a cylinder interlocked for rotation with a spool. This device further comprises an auxiliary brake, actuated by a lever one end of which is controlled by the operator and the other end of which bears on the main brake shoe.

Such a device provides the auxiliary brake functions but has major drawbacks which have prevented its commercial development: thus, the auxiliary brake lever has a practically zero travel range, which makes adjustment of the braking torque very difficult, especially in the fishing sphere where one must react rapidly and accurately; furthermore, no means is provided for limiting the auxiliary braking torque, and it has been discovered that the use of such a device leads to frequent breaking of the line: in addition, the imbalance of the lever produces, through the effect of its weight, parasite braking due to the orientation of the reel. It will be noted that this auxiliary brake structure is not directly applicable to a main brake of the washer type.

The aim of the present invention is particularly to provide additional braking means in which the range of travel of the lever is not zero and is also independent of the adjustment of the rear brake. The user is in fact better able to regulate the braking force by adjusting the position of the lever rather than the pressure exerted thereon by hand. These means may be actuated by a resilient return lever providing immediate and simple efficiency.

With the invention, this additional braking is provided with a very few additional parts, more especially by using certain parts of the rear brake playing a double role and in a structure compatible with reels having a rear brake of the washer type.

Another advantage of the invention is that the position of the lever is independent of the adjustment of the rear brake and in particular its rest position is always the same. The angler may thus feel the additional braking which he is causing through the force he exerts on the lever. Moreover, it is important that there should be no additional braking when the lever is not actuated.

With the braking means of the invention, the additional braking torque may, in particular, be made substantially proportional to the movement of the lever alone, independently of the setting of the rear brake and over the whole of the usual braking range of this brake.

Breakage of the line is avoided in accordance with the invention by providing means constantly limiting the maximum additional braking torque provided by the additional brake.

SUMMARY OF THE INVENTION

To attain these objects as well as others, according to the present invention, in a rear brake reel of a known type comprising an auxiliary brake producing an adjustable additional braking torque applied to the sleeve of the rear brake by means of a braking member urged by an auxiliary braking lever having a part which is accessible and may be gripped by the user:

a resilient transmission means is inserted directly between the grippable part of the auxiliary braking lever and the braking member, for transmitting the auxiliary braking force, the auxiliary braking lever is urged by resilient return means bringing it back to the rest position, so that the rest position of the auxiliary braking lever is constant, the influence of the weight of the lever is inhibited, the range of travel is not zero, the maximum value of the additional braking torque is limited and the stiffness of the auxiliary braking lever is practically independent of the setting of the main brake.

According to another feature of the invention, the lever is mounted for oscillation between a first fixed stop on the housing against which it is returned by the resilient return means and a second fixed stop on the housing limiting its maximum travel; thus, the combination of the second fixed stop and the resilient transmission means limits more accurately the compression force produced by the lever on the braking member and prevents any excessive additional braking torque, which would cause the line to break.

BRIEF DESCRIPTION OF THE DRAWINGS

Other objects, features and advantages of the present invention will be clear from the following description of particular embodiments with reference to the accompanying Figures in which.

DESCRIPTION OF THE PREFERRED EMBODIMENT

In the following description, parts similar to those of the prior art reel shown in FIG. 1 have been shown with the same references.

Figure 1:
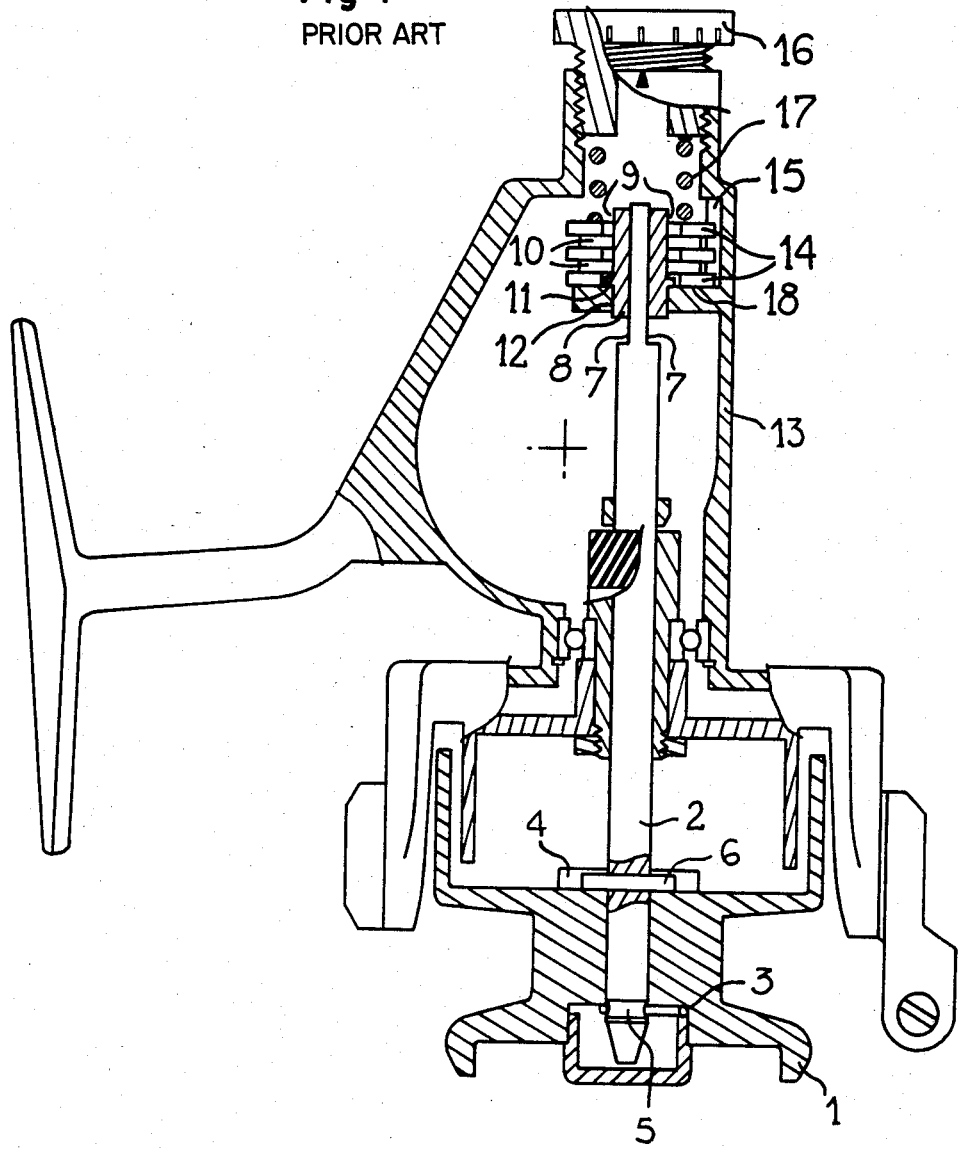
FIG. 1 illustrates a rear brake reel of the prior art.
Figure 2:
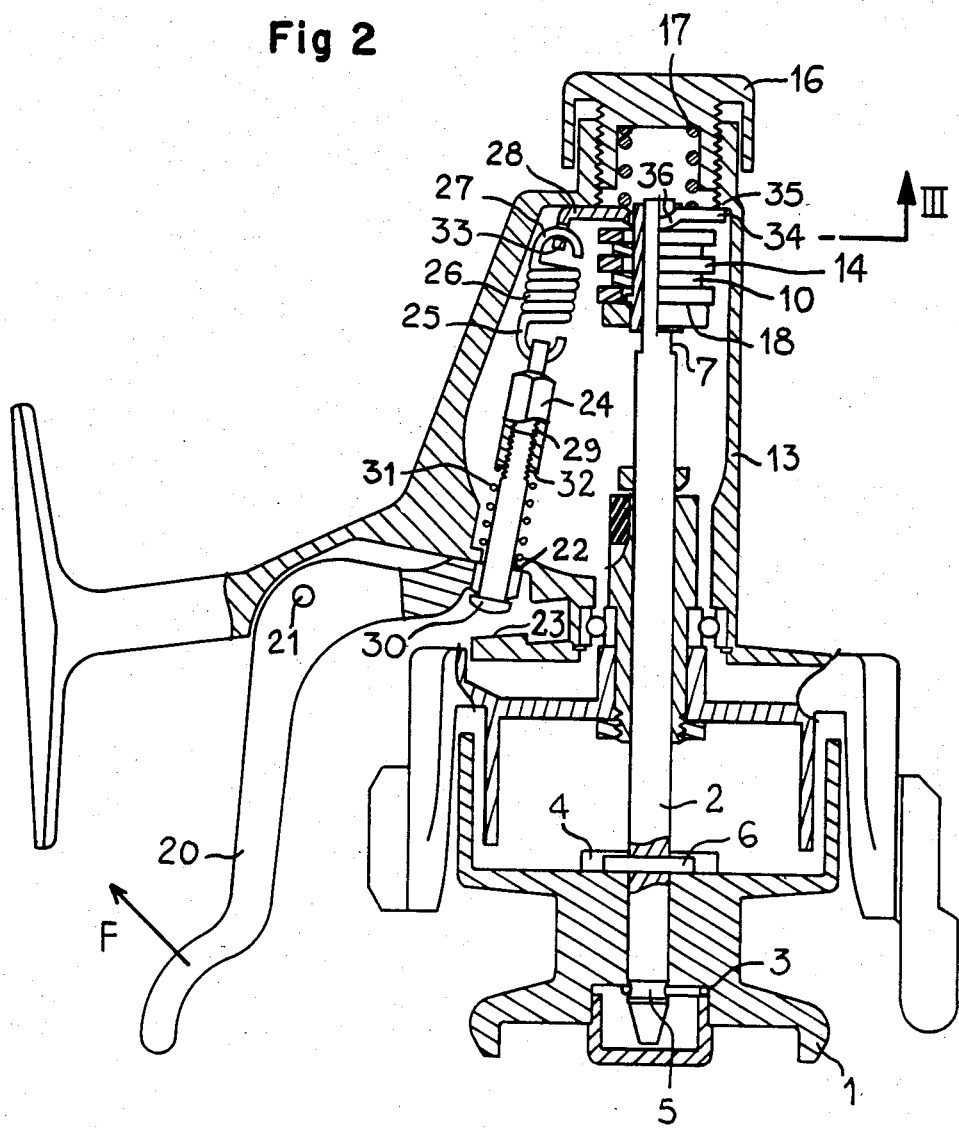
FIG. 2 shows a reel of the invention in longitudinal section.
Figure 3:
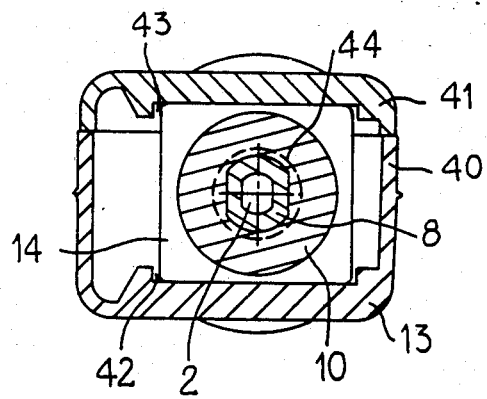
FIG. 3 shows a cross sectional view through axis I—I of FIG. 2.

In the reel of the present invention shown in FIGS. 2 and 3, the rear brake has exactly the same construction as in the known devices shown in FIG. 1.

The reel of the invention comprises an auxiliary braking lever 20, pivotably mounted to housing 13 by a transverse rotational shaft 21. The lever is disposed in a longitudinal position substantially parallel to the rod on which the reel is to be mounted, so that it may be directly operated by the hand holding the rod.

Lever 20 may rock between a first fixed stop 22 on housing 13 and a second fixed stop 23 on the housing. A connecting rod 24 transmits the movements of lever 20 to the first end 25 of a second spring 26, a traction spring, whose second end 27 is hooked onto a rocking lever 28.

Connecting rod 24 comprises an inner threaded portion 29 in which is engaged a threaded screw 30 for adjusting its length. A third spring 31, a compression spring, has one end bearing against a shoulder 32 of the connecting rod 24 and a second end bearing against housing 13. The third spring 31 together with the second spring 26 exert a force on lever 20 returning it to the first fixed stop 22 of the housing, in which position the lever is at rest and spring 26 has zero tension. Furthermore, the third spring 31 substantially improves the sensory effect felt by the user when he operates the lever: in fact, in the absence of a third spring 31, for producing the desired additional braking, a low traction force provided by spring 26 is sufficient, corresponding to a bearing force F of about 50 to 100 Newton at the end of the lever. Spring 31 is chosen so as to have a prestress or residual non zero tension in the rest position of lever 20, and a stiffness such that an increasing force from about 40 Newton to about 150 Newton must be applied to the end of the lever so as to move it from the rest position to maximum braking. Thus, the user feels safe and braking changes which are too sudden are avoided because of the required minimum threshold and because of the substantial increase of force which must be exerted by the user for operating the lever.

By actuating lever 20, a traction force is generated on rocking lever 28, which force is transmitted by the connecting rod 24 and spring 26. At the end of travel, when lever 20 comes into abutment against the second stop 23, the traction force exerted on rocking lever 28 is maximun and is defined by the second spring 26.

The rocking lever 28 comprises a first end 33 to which spring 26 is hooked and a second end 34 pivotally linked to housing 13. The rocking lever 28 may rock about its second end 34 by actuating the lever.

In the embodiments shown in the Figures, the second end 34 of the rocking lever bears unidirectionally on a shoulder 35 of the housing.

Rocking lever 28 comprises a central projecting part 36 in contact with the stack of washers 10 and 14 and adapted for pushing the washers back against stop 18 of the housing, under the action of one or both springs 17 and 26.

Rocking lever 28 may have the form of a washer, i.e. with the central aperature for free passage of sleeve 8. In a first alternative, the central aperture is sufficiently large to let spring 17 also pass therethrough which comes into abutment either directly, or through a pusher not shown, against the first washer of the stack of washers 10 and 14; in another alternative of the invention, the central aperture is smaller so that spring 17 or its pusher is in abutment against the rocking lever 28, itself abutting against the stack of washers. Rocking lever 28, then inserted between spring 17 and the stack of washers, transmits the pressure exerted by spring 17 of the rear brake.

The operation of the device is as follows: in the rest position of lever 20, i.e. in abutment against stop 22 under the action of spring 31, the force transmitted by the second spring 26 to the rocking lever 28 is zero. The only braking torque is generated by the rear brake, i.e. by adjusting nut 16 compressing spring 17 which itself compresses the stack of washers 10 and 14.

When the rear brake generates a given braking torque, lever 20 may generate an additional braking torque: by actuating the lever, the connecting rod 24 tensions spring 26 which transmits a traction force to rocking lever 28 itself causing an increase in compression of the stack of washers 10 and 14. The effect exerted by lever 20 is limited by the combination of stop 23 and spring 26. In the largest part of the operating zone of the rear brake, the additional braking torque is substantially proportional to the angular movement of lever 20.

In FIG. 3 it can be seen that housing 13 comprises two parts, a first part 40 on which a second lid-forming part 41 is fitted. Washers 10, rotary washers, are mounted for sliding on sleeve 8 with respect to which they are locked against rotation by flats. Washers 14, or fixed washers, are free to rotate and move in translation with respect to sleeve 8, and slide with respect to housing 13 in which they are secured against rotation by engagement in corresponding grooves 42 and 43 in the housing. For that, washers 14 have a substantially rectangular section, better shown in FIG. 3, and a central circular hole 44 having a diameter greater than the outer diameter of sleeve 8. Washers 10 on the other hand have a circular section with an outer diameter less than the distance separating the bottoms of grooves 42 and 43, and a central hole whose section comprises flats and corresponds to the outer form of the portion of sleeve 8 on which they are engaged. In the embodiment shown in FIG. 3, each of the two parts 40 and 41 of housing 13 comprises one of the two grooves 42 and 43.

Washers 10 and 14 may be single or multiple and may be separated by intermediate washers made from a material having a suitable friction coefficient, such for example as: leather, polytetrafluorethylene, asbestos, felt, etc.

The present invention is not limited to the embodiments which have been explicitly described, but includes the different variations and generalizations thereof contained within the scope of the following claims.

What is claimed is:

1. A reel of the fixed spool type with rear brake, comprising a reel housing, a drive shaft having a first end, a spool mounted on the first end of the shaft, means mounting the shaft and the spool for reciprocation within the housing so as to distribute the line on the spool, a sleeve integral with a braking surface and locked for rotation with the spool and rotatable freely in a cavity of the reel housing in which it is secured against axial translation, a main spool brake comprising a braking member and an operating member actuatable in a first direction from the rear of the reel by the user and pushing the braking member against the braking surface of said sleeve for braking rotation thereof with respect to said housing, an auxiliary braking lever comprising a grippable part forming a control member for also pushing the braking member in the first direction for braking rotation of the sleeve with respect to the housing, resilient transmission means directly between the grippable part of the auxiliary braking lever and the braking member for transmitting an auxiliary braking force, and resilient return means for urging said auxiliary braking lever to its rest position, so that the rest position of the auxiliary braking lever is constant, the influence of the weight of the lever is inhibited, the range of travel of the lever is non zero, the maximum value of the additional braking torque is limited and the stiffness of the auxiliary braking lever is practically independent of the setting of the main brake.

2. The reel as claimed in claim 1, further comprising means for mounting said level to rock between a first fixed stop of the housing against which it is returned by said resilient return means and a second fixed stop of the housing limiting is maximum travel, so that the combination of said second fixed stop and said resilient transmission means limits the maximum braking torue generated by the auxiliary brake.

3. The reel as claimed in claim 2, wherein said resilient transmission means comprises a spring transmitting the tension generated by the lever, said tension being zero when the lever is in abutment against the first stop of the housing, said spring participating in the resilient return of the lever.

4. The reel as claimed in claim 1, wherein (1) the operating member of the main spool brake includes a first spring; (2) the braking member of the main spool brake includes a stack of washers which is axially compressible, at least one washer of said stack mounted for sliding movement on said sleeve and rotatable with said sleeve within said housing, and at least one washer of of said stack mounted for sliding and relative rotary movement on said sleeve and locked against rotation within said housing, said stack of washers positioned between a stop of the housing and said spring; (3) said braking member further includes a rocking lever having a first end coupled to said auxiliary braking lever, a second end pivotably linked to said housing and a central part engaging the stack of washers and capable, through actuation of the lever, of pushing the stack of washers back against the stop in the same direction as said spring; and said reel further includes axial adjustment means, including a threaded axial adjustment nut, for adjusting the compression of said spring.

5. The reel as claimed in claim 4, wherein said resilient transmission means include a second spring positioned between the auxiliary braking lever and said rocking lever.

6. The reel as claimed in claim 5, wherein said resilient return means include a third spring for modifying the sensory effect of the auxiliary braking lever, said third spring exerting on said auxiliary braking lever a return force tending to bring it back to its rest position and having a prestress when theauxiliary braking lever is at rest.

7. The reel as claimed in claim 5, wherein said rocking lever has the general shape of a washer, with a central aperture whose diameter is sufficient for allowing said sleeve to pass freely therethrough, said first spring coming into abutment against said rocking lever.

8. The reel as claimed in claim 6, wherein said resilient transmission means include a connecting rod comprising an internally threaded portion and a screw engaging said internally threaded portion for adjusting the connecting rod in length.

* * * * *